RHYTHMIC TELEGRAPH SYSTEM
Filed Dec. 20, 1954
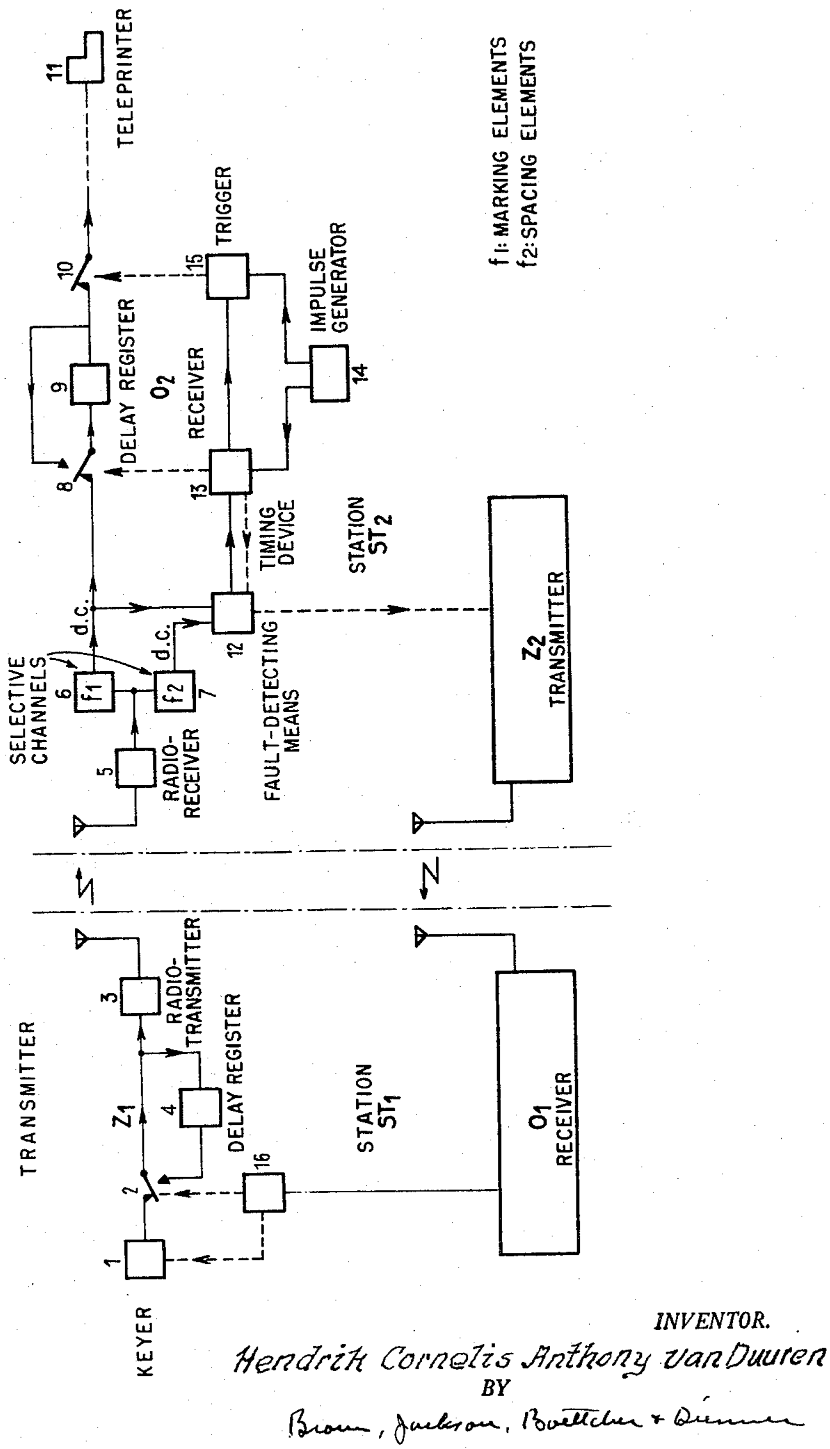
INVENTOR.
*Hendrik Cornelis Anthony van Duuren*
BY
*Brown, Jackson, Boettcher & Dienner*
*Attys.*

2,903,514

RHYTHMIC TELEGRAPH SYSTEM

Hendrik Cornelis Anthony Van Duuren, Wassenaar, Netherlands, assignor to Staatsbedrijf der Posterijen, Telegrafie en Telefonie, The Hague, Netherlands Application December 20, 1954, Serial No. 476,441

Claims priority, application Netherlands December 22, 1953

7 Claims. (Cl. 178—23)

The invention relates to a rhythmic telegraph system for the radio-telegraphic transmission of signals consisting of a constant number of elements of equal duration. In a rhythmic telegraph system the signals are fundamentally sent in an uninterrupted sequence.

A system is known already, in which the telegraph signals are transmitted in such a code that at the receiving end a contingent mutilation can be detected in a simple way. The code may e.g. be so arranged that each signal contains as many marking elements as spacing elements.

If a signal is received, not corresponding with some signal of the code, e.g. because as a result of atmospherics or fading one or more marking elements are received as spacing elements or conversely, the relevant signal is rejected and the receiving station sends a signal back to the transmitting station, which subsequently repeats the last two or the last few signals transmitted, the receiver being made inoperative till the moment when the rejected signal is to be received anew. A disadvantage of this system consists in that the normal teleprinter alphabet cannot be used, so that at the transmitting end the signals must be converted into another code and at the receiving end they must be converted back into the original code. This generally requires a rather complicated apparatus. Besides, a fault occurring in the transmission can only be detected at the end of a complete signal, so that a request for repetition can only be transmitted at the end of a signal and not at the moment when a wrong element is received.

In the system according to the invention marking and spacing elements are transmitted via different frequency channels and the received signals are applied via switching means to a delay register, which causes a delay equal to a whole number times the duration of a signal. The outgoing signals, which are e.g. fed into a teleprinter or a perforator, are drawn from the delay register. The receiver also comprises fault-detecting means, which compare the output voltages of the two frequency channels and operate when the difference of these voltages remains below a threshold value. Consequently, in this system the signals are checked element by element and not as a whole, as in the former system. When the fault-detecting device operates, a signal is sent back to the transmitter, after which the transmitter repeats a certain number of the last signal elements transmitted. This number is equal to a whole number times the number of elements in a signal. The repetition may begin within arbitrary signal element, i.e. in the middle of a signal. Further the operation of the fault-detecting means in the receiver causes the said switching means to cut off the supply of signals to the delay register, the output of this register being fed back to the input terminal for the duration of the repetition.

The invention will be explained in connection with the drawing, which shows diagrammatically two co-operating stations $ST_1$ and $ST_2$. Each of these stations contains a transmitter, $Z_1$ and $Z_2$, respectively, and a receiver, $O_1$ and $O_2$, respectively. Transmitter $Z_1$ co-operates with receiver $O_2$ for th radio-telegraphic transmission of messages from station $ST_1$ to station $ST_2$. When a telegram is sent from $ST_1$ to $ST_2$, another telegram is sent simultaneously from $ST_2$ to $ST_1$ via transmitter $Z_2$ and receiver $O_1$. If no such telegram is available, the transmission between $ST_2$ and $ST_1$ is still kept up, e.g. in the form of service signals. The transmitter $Z_1$ includes a keyer 1, such as the type shown in Figure 1 of Patent No. 2,603,705, which issued to Hendrik Cornelis Anthony van Duuren on July 15, 1958, for coupling signals in a telegraphic code having marking and spacing elements over contact 2 to the input side of radio-transmitter 3, for modulating the radio-transmitter in accordance with the marking and spacing elements of the signal so coupled. This modulation may be accomplished by employing two different side-band frequencies, *f1* and *f2* in the manner of the showing of the patent to Bakker and van Duuren, 2,235,755, issued March 18, 1941. The carrier frequency output of the radio-transmitter is modulated with frequency *f1* to represent the marking element, and with frequency *f2* to represent the spacing element. The modulated signals so transmitted are received by radio-receiver 5 at station $ST_2$; radio receiver 5 is at the input side of receiver $O_2$ at station $ST_2$. The output of radio receiver 5 is coupled to the input sides of a pair of selective channels, 6 and 7. Selective channel 6 is constructed and arranged to pass only signals of frequency *f1*, while channel 7 is likewise constructed and arranged to pass only signals of frequency *f2*. The output signals of channels 6 and 7 are D.C. signals proportional to the signals coupled to their respective input sides. The output signals of both channels 6 and 7 are coupled to the input side of a fault-detection means 12, and the output signal of selective channel 6 is additional coupled through contact 8, delay register 9, contact 10, to an apparatus 11, which may be a teleprinter, perforator means, or other equipment. Distributor means coupled to the delay register 9 are operative to extend the signals in the register only after the expiration of a period equal to the duration of a normal telegraph signal. For example, when receiving a conventional seven-element signal, where each element of a signal is 20 milliseconds (ms.) in length, each signal has a duration of 140 ms. In such event, the signal elements will be coupled from the output side of delay register 9 at a time 140 ms. later than they were coupled to the input side of the register. In addition to being coupled over contact 10 to teleprinter 11, the output side of delay register 9 is also coupled to the normally open contact opposite contact 8. The delay register and distributor may have the general arrangement of the signal storing and distributor means shown in the Patent 2,706,215 which issued to Hendrik Cornelis Anthony van Duuren on April 12, 1955.

As noted heretofore, the invention is directed to the minimization of lost time experienced in message transmission, and particularly to reduction in the time required to effect repetition of a transmission which has been detected as faulty. To this end the D.C. output signals of selective channels 6 and 7 which are normally of a certain level are coupled to fault-detecting means 12 which in turn functions to examine this level, and is only actuated when the difference of the D.C. signal outputs of channels 6 and 7 remains below a certain threshold voltage level. Such occurrence indicates that a signal was received from one of the selective channels at a time when no signal should have been received in that channel (perhaps caused by static), or no signal appeared in a particular channel at a time when a signal should have appeared in that channel (perhaps caused by fading). Such operation may be more clearly illustrated by the use of a set of specific signal values, which are chosen at random hereat for exemplary purposes only. As noted above, the transmitter is modulated with either frequency *f1* or *f2*—never with both frequencies or neither of them. At the receiver end the selective channel 6 provides a D.C. voltage signal of a given value whenever frequency *f1* is received, and selective channel 7 provides a D.C. voltage signal of a given value whenever frequency *f2* is received. Assuming for exemplary purposes that the output of channel 6 with a signal therein is 15 volts, the difference in output of the two channels 6 and 7 wil normally be 15–0=15 volts (the designated threshold in the example). However, if fading occurs in channel 6 during transmission of the element the signal output will be less than 15 volts (assume 12 volts for example) and the difference between the signals will be 12–0=12 volts. Since this is less than the established threshold value, the fault detector operates. Assuming alternatively that atmospheric conditions cause a false signal to appear in channel 7 during the period that a signal is being transmitted in channel 6, it is apparent that however small the value, the difference between the output of channels 6 and 7 will be below the established threshold, and the fault detector means will operate. Thus in the event that either fading or atmospheric disturbances effect mutilation of an element, the fault detector will operate to terminate signal transmission and initiate a request for signal repetition as now described.

Briefly, upon detection of such a mutilation, signal generator means in the fault-detecting means 12 transmit an output signal to a first switching or timing device 3 and also to transmitter $Z_2$ of station $ST_2$. The mutilation signal coupled to timing device 13 causes it to perform two separate functions. Timing device 13, which may comprise an impulse-responsive switching device of known form, is immediately operative to disable the connecting circuit between the receiver means and the register means by shifting the relay arm from lower contact 8 to the upper contact, so that the output side of delay register 9 is now connected to its input side. Thus the signal elements stored in delay register 9 are coupled in a feedback loop from its output side to its input side, and from the output terminal through contact 10 to teleprinter 11.

More specifically with operation of the fault detecting means, timing device 13 effects closure of the loop, and thereupon initiates the count of a series of timing impulses as provided by impulse generator 14 (which is synchronized with transmitter $Z_1$). With advancement of the count to fourteen (each impulse being of a 20 ms. duration), the timing device 13 returns contact 8 to its original position (as illustrated in the drawing). During this fourteen impulse period, timing device 13 is also effective to disable fault-detecting means 12. It is apparent therefore that with detection of a mutilated element, the delay register in the receiver is connected from the input circuit for a time period which is the equivalent of two signals (fourteen elements) and the output of the register is connected to the input during such period so that the elements on the register at the time of receipt of the first retransmitted element (the disturbed element) will be the same as those on the register at the time request for message repetition was initiated.

It is, of course, obvious that the disturbed element may be any one of the signal elements. It is desirable in most cases to extend the elements of the signal which are on the register to the printer before interrupting the connection to the teleprinter and a second switching means is provided for such purpose.

Briefly, an impulse generator 14 is operative to couple signals at 140 ms. intervals to a trigger 15, impulse generator 14 being synchronized with transmitter $Z_1$, to provide these 140 ms. signals at the end of transmission of a complete signal from the delay register 9 over contact 10 to the teleprinter 11. However, trigger 15 is operative only with the simultaneous receipt of a signal from the output of timing device 13 indicating that a mutilated signal has been detected. Thus whenever a mutilated signal is detected, timing device 13 operates contacts 8 to effect connection of the output of delay register 9 to its input side, and also couples a signal to trigger 15 which, upon receipt of the next pulse from impulse generator 14, operates therewith to open contact 10 for the duration of the delay period. This operation insures that teleprinter 11 receives a complete series of elements for a signal in an uninterrupted sequence. Upon the connection of contact 8 to the output side of selective channel 6 again, contact 10 is again closed and the output of delay register 9 is again coupled to the input of teleprinter 11. Impulse generator 14 and trigger 15 may be of the general type set forth in the copending application which was filed March 2, 1953, and assigned Serial No. 339,702.

At the same time that fault-detecting means 12 coupled a signal to timing device 13, the fault-detecting means 12 also coupled a signal to transmitter $Z_2$ at station $ST_2$. Thereupon, the transmitter $Z_2$ transmits an indication that a mutilated signal has been received at station $ST_2$; this signal is received by receiver $O_1$ at station $ST_1$, and coupled to device 16. Device 16 opens contact 2, thereby forming a feedback loop for delay register 4 and connecting the output side of delay register 4 to the input side of radio-transmitter 3. Delay register 4 in transmitter $Z_1$ is effective to store signal elements (considering seven-element signals, each element 20 ms.) for a duration of 280 ms., that is, for two complete signals. Device 16 is operative to switch the relay arm and open contact 2 for a period equal to the transmission period of two complete signals, which period is identical with the interval during which timing device 13 in receiver $O_2$ opens contact 8. Therefore, upon receipt of the mutilation indication at station $ST_1$ and displacement of the relay arm to open contact 2, the last two signals stored in delay register 4 are coupled to the input of radio-transmitter 3, and thereafter the resulting modulated signal is transmitted to radio-receiver 5 at receiver $O_2$ of station $ST_2$. These two signals are received at radio-receiver 5 at an interval of 280 ms. later than their first reception at station $ST_2$. Therefore, it is apparent that upon restoration of contact 8, the signal element rejected by fault-detecting means 12 is again received for passage through delay register 9 to teleprinter 11. Thus it is apparent that the novel system effects rapid detection of element disturbances, and increased speed of message transmission.

While I have illustrated and described what I regard to be the preferred embodiment of my invention, nevertheless it will be understood that such is merely exemplary and that numerous modifications and rearrangements may be made therein without departing from the essence of the invention, I claim:

1. In a communication system having at least a plurality of stations interconnected by a communication channel over which impulse signals comprised of marking and spacing elements are transmitted, receiver means at each station connected to said channel, register means for registering the elements of each multi-element signal, a first circuit means connected to extend the signal elements from said receiver means to said register means, a second circuit means connected to extend the signal elements from said register means to associated printing means, distributor means connected to said register means to couple the elements of each signal on said register means over said second circuit means to said printer means only after a delay equivalent to at least one whole signal period, fault detection means connected to said receiver means for detecting a mutilated element as received, means connected to said fault detection means operative to transmit a repeat-request signal immediately responsive to detection of a mutilated signal element by said fault detection means, and circuit control means operatively controlled by said fault detection means responsive to receipt of a mutilated signal to immediately disable said first circuit means and to disable said second circuit means only after the complete coupling of the remainder of the elements of the signal being extended to the printer means at the time of the mutilation.

2. In a communication system having at least a plurality of stations interconnected by a communication channel, receiver means at each station connected to said channel for receiving multi-element impulse signals thereover, register means connected to said receiver means for registering the elements of each incoming signal, circuit means coupled to said register means for extending the signals on said register means to associated printing means, distributor means coupled to said register means operative to extend the signals in said register means over said circuit means only after delay of a period sufficient to register all of the elements of the incoming signal, fault detection means for detecting distortion of an element of a signal prior to complete registration of the signal on the register, and transmitter means connected to said fault detection means operative to transmit a repeat-request signal to the associated station prior to the coupling of a subsequent element to the fault detection means.

3. In a telegraph system having at least a plurality of stations interconnected by a communication channel, receiver means at each station connected to said channel for receiving said multi-element signals thereover, fault detection means connected to said receiver means for detecting distortion of a signal element immediately with the receipt thereof, transmitter means operatively controlled by said fault detection means responsive to detection of a mutilated signal element to transmit a repeat-request signal prior to receipt of a subsequent element, register means connected to said receiver means for registering the elements of each undisturbed signal element as received, circuit means for coupling the output signals of said register means to associated printing means, distributor means coupled to said register means for effecting a delay in the transmission of the incoming signals from the register means over said circuit means to said associated printing means for a period equal in time to a whole number times the duration of a complete signal, and circuit control means connected to said fault detection means operative responsive to detection of a mutilated signal thereby to disable immediately the connection between said receiver means and said register means, and to disable the connection between said register means and said printing means only after the last element of the delayed signal has been coupled from said register means to said printing means.

4. In a telegraph system comprised of a plurality of stations having means for transmitting and receiving multi-element impulse signals over an interconnected channel, receiver means at each station connected to said channel, register means connected to said receiver means for registering the elements of each incoming signal, circuit means for coupling said register means to associated printer means, distributor means connected to said register means operative to extend said signals to said associated printer means only after the expiration of a delay period equal in time to a whole number times the duration of a complete signal, fault detection means connected to said receiver means to detect a mutilated signal element as received, transmitter means connected to said fault detection means operatively controlled by said fault detection means to transmit a repeat-request signal to the transmitting one of the stations immediately upon detection of a mutilated element in an incoming signal and prior to the coupling of a subsequent signal element to said register means, signal repetition means in the remote station operative with the receipt of such signal to control the transmitter means thereat to retransmit a preassigned number of the signal elements previously transmitted, which preassigned number is equal to a whole number times the number of elements in a complete signal; and a first switching means connected to said fault detection means operative responsive to the detection of a mutilated signal by said fault detection means to immediately disconnect said delay register from said receiver means and to simultaneously couple the output of said delay register to the delay register input to form a feedback loop until the repeat element requested is received, a second switching means for interrupting the connection between said register means and said printer means, and impulse generator means connected to said second switching means to control same to interrupt said connection only responsive to the complete extension to said printer means of the signal which was being extended thereto at the time of the detection of the mutilated signal.

5. In a telegraph system comprised of a plurality of stations having means for transmitting and receiving multi-element impulse signals over an interconnected channel, receiver means at each station connected to said channel, register means connected to said receiver means for registering the elements of each incoming signal, circuit means for connecting the output of said register means to associated printer means, distributor means operative to extend said signals to said associated printer means over said circuit means only after a delay equal in time to a whole number times the duration of a complete signal, fault detection means connected to said receiver means for detecting a mutilated signal element as received, transmitting means at each station connected to said fault detection means to provide a repeat-request signal to the transmitting one of the stations immediately upon detection of a mutilated element in an incoming signal and prior to the coupling of a subsequent signal element to said register means, a first switching means connected to said fault detection means operative responsive to operation of said fault detection means to disconnect said delay register from said receiver means, and to simultaneously couple the output of said delay register to the delay register input to form a feedback loop until the repeat element requested is received, and a second switching means connected to said first switching means operative to disconnect said delay register from the associated printer means, and impulse generator means connected to said second switching means operative to transmit a control signal thereto only after the last element of the delay signal being transmitted to said printer means at the time of the detection of the mutilated element is forwarded thereto.

6. A communication system as set forth in claim 5 in which said first switching means comprises a signal generator device connected to said fault detection means operative to couple an additional control signal to said second switching means responsive to detection of a mutilated element by said fault detection means, and means connected in said second switching means operative to disable said circuit means between said register means and the associated printer means only responsive to the concurrent coupling of both of said control signals to said second switching means.

7. A communication system as set forth in claim 5, in which said signal generator means is also operative to generate signal impulses synchronized to the impulses which appear on said channel, and said first switching means includes counting means for counting the generated signal impulses operative to reestablish said connection between said receiver means and said register means responsive to advancement of the count to a number equivalent to the number of elements in two whole signals.

References Cited in the file of this patent

UNITED STATES PATENTS

| | | |
|---|---|---|
| 2,235,755 | Bakker et al. | Mar. 18, 1941 |
| 2,279,353 | Van Duuren | Apr. 14, 1942 |
| 2,512,038 | Potts | June 20, 1950 |
| 2,575,268 | Griffith | Nov. 13, 1951 |
| 2,706,215 | Van Duuren | Apr. 12, 1955 |

FOREIGN PATENTS

| | | |
|---|---|---|
| 149,752 | Australia | Jan. 29, 1953 |